(12) United States Patent
Drader et al.

(10) Patent No.: US 9,476,979 B2
(45) Date of Patent: Oct. 25, 2016

(54) METHOD FOR EVALUATING POSITION AND MOTION USING TIME OF FLIGHT DETECTORS

(71) Applicant: STMICROELECTRONICS (GRENOBLE 2) SAS, Grenoble (FR)

(72) Inventors: Marc Drader, Lans en Vercors (FR); Jeremie Teyssier, Grenoble (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 232 days.

(21) Appl. No.: 14/554,134

(22) Filed: Nov. 26, 2014

(65) Prior Publication Data

US 2015/0144767 A1 May 28, 2015

(30) Foreign Application Priority Data

Nov. 28, 2013 (FR) ...................... 13 61811

(51) Int. Cl.
| G06M 7/00 | (2006.01) |
| G01S 17/02 | (2006.01) |
| G01S 17/06 | (2006.01) |
| G01S 7/486 | (2006.01) |
| G01S 17/08 | (2006.01) |
| G01S 17/88 | (2006.01) |
| G01S 7/497 | (2006.01) |
| G06F 3/01 | (2006.01) |
| G06F 3/03 | (2006.01) |

(52) U.S. Cl.
CPC ............ *G01S 17/026* (2013.01); *G01S 7/4866* (2013.01); *G01S 7/497* (2013.01); *G01S 17/06* (2013.01); *G01S 17/08* (2013.01); *G01S 17/88* (2013.01); *G06F 3/017* (2013.01); *G06F 3/0304* (2013.01); *G01S 2007/4975* (2013.01)

(58) Field of Classification Search
CPC ........ G01C 3/08; G01S 7/4861; G01S 7/497
USPC .......................... 250/221, 551; 345/173, 175
See application file for complete search history.

(56) References Cited

U.S. PATENT DOCUMENTS

| 5,103,085 | A | * | 4/1992 | Zimmerman | ........... G01S 17/06 250/214 B |
| 9,006,641 | B2 | * | 4/2015 | Drader | .................... G01C 3/08 250/221 |
| 2004/0257556 | A1 | | 12/2004 | Samukawa | |
| 2013/0175435 | A1 | | 7/2013 | Drader | |

FOREIGN PATENT DOCUMENTS

WO 0229711 A2 4/2002

* cited by examiner

*Primary Examiner* — Kevin Pyo
(74) *Attorney, Agent, or Firm* — Allen, Dyer, Doppelt, Milbrath & Gilchrist, P.A.

(57) ABSTRACT

A method is for evaluating a coverage factor of a photon emission cone of a time of flight sensor. The method may include the steps of assigning a reference curve to the sensory providing a photon flux intensity as a function of time of flight; and acquiring a time of flight and a corresponding flux intensity with the sensor. The method may also include reading the intensity provided by the reference curve for the acquired time of flight, and providing an indication of the coverage factor based on the ratio between the acquired intensity and the read intensity.

17 Claims, 4 Drawing Sheets

METHOD FOR EVALUATING POSITION AND MOTION USING TIME OF FLIGHT DETECTORS

FIELD OF THE INVENTION

The invention relates to human-machine interfaces, and, more particularly, to sensing the position and motion of a hand or object relative to a screen.

BACKGROUND

Many touch screens, such as those used in mobile phones and tablets, are equipped with proximity detectors. These detectors, often using infrared transmitters, are designed to detect simple gestures, such as the approach of an object. This detection is used, for example, to disable the touch screen function during a call when the phone is near the ear of the user.

Infrared sensors typically use the brightness reflected by the target object. Thus, a distance evaluated using an infrared sensor is a rough estimate, since it depends on the reflectance and the tilting of the target object.

Patent application US20130175435 discloses a proximity detection technique using a photon time of flight sensor.

FIG. 1 schematically illustrates an implementation of a time of flight sensor as described in the aforementioned patent application. The sensor includes, on a printed circuit board 8, an infrared radiation source 10 emitting photons in a cone 12. A photon detector 14 is arranged on the printed circuit board close to the transmitter 10 for receiving photons reflected from a target object placed in the cone 16. The detector 14 is based on so-called single photon avalanche diodes (SPAD).

A control circuit, not shown, energizes the transmitter 10 with short duration pulses and observes the signal from the detector 14 to determine the elapsed time between each pulse and the return of a corresponding burst of photons on the detector 14. The circuit thus measures the time of flight of the photons along a path 18 going from the transmitter 10 to the object 16 and returning to the detector 14. The time of flight is proportional to the distance between the object and the detector, and does not depend on the intensity of the received photon flux, which varies depending on the reflectance of the object.

A time of flight sensor of the type of FIG. 1 thus makes it possible to accurately determine the distance of a target object relative to the sensor without being influenced by the reflectance of the object or parasitic phenomena that alter the intensity of the photon flux received by the detector, such as the interposition of a tinted glass.

SUMMARY

It would be convenient to use one or more time of flight sensors to determine not only the distance of the object (z coordinate), but also its transverse position (x and y coordinates), or to detect a transverse movement of the object.

A method is provided for evaluating a coverage factor of a photon emission cone or area of a time of flight sensor, comprising the steps of assigning a reference curve to the sensor, providing a photon flux intensity as a function of time of flight; acquiring a time of flight and a corresponding flux intensity with the sensor; reading the intensity provided by the reference curve for the acquired time of flight; and providing an indication of the coverage factor based on the ratio between the acquired intensity and the read intensity.

The reference curve may be constructed in a calibration phase according to the steps of moving a reference object along the axis of the emission cone between two positions where the object completely covers the emission cone; during the movement, storing multiple time of flight values and the corresponding flux intensities; and constructing the reference curve from the stored values.

The reference curve may be selected from a set of multiple reference curves assigned to different reflectance values, according to the steps of measuring changes in the intensity of the flux; storing a local maximum value of the intensity of the flux and the corresponding time of flight; and finding in the set of curves the curve that, for the stored time of flight, provides the intensity closest to the stored local maximum value.

A method for detecting motion of an object may use a time of flight sensor, according to the steps of evaluating a coverage factor of the emission cone of the time of flight sensor; and determining that the object approaches the time of flight sensor when the coverage factor increases, or determining that the object moves away from the time of flight sensor when the coverage factor decreases.

The method for detecting motion may use two time of flight sensors emitting photons in respective emission cones of parallel axes, according to the steps of evaluating a coverage factor of each emission cone; and detecting a motion of the object from a first cone to the second cone when the coverage factor of the second cone increases and the coverage factor of the first cone decreases.

A method for evaluating a position of an object may use a first pair of time of flight sensors emitting photons in respective emission cones of parallel axes, according to the steps of evaluating a coverage factor of each emission cone; and producing an abscissa of the object as the barycenter of the abscissas of the time of flight sensors, weighted by the coverage factors of the corresponding emission cones.

The method may use a second pair of time of flight sensors arranged along an ordinate axis perpendicular to the axis, of abscissa, of the first pair of sensors, according to the steps of evaluating a coverage factor of each emission cone of the second pair of sensors; producing an ordinate of the object as the barycenter of the ordinates of the second pair of sensors, weighted by the coverage factors of the corresponding emission cones; and producing an elevation of the object based on the average of the times of flight provided by the sensors.

An electronic device may include an infrared radiation source, an adjacent photon detector, and a control circuit configured to define the coverage factor as described above.

BRIEF DESCRIPTION OF DRAWINGS

Other advantages and features will become more clearly apparent from the following description of particular embodiments of the invention provided for exemplary purposes only and represented in the appended drawings, in which.

DETAILED DESCRIPTION

In order to detect a transverse position change of an object with a time of flight sensor, it is proposed to combine the information of distance and intensity produced by the sensor.

Figure 1:
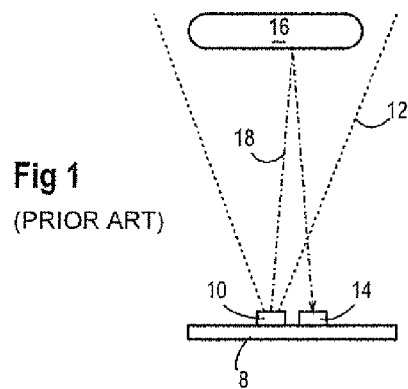
FIG. 1, previously described, schematically illustrates a conventional implementation of a proximity sensor measuring the time of flight of photons.
Figure 2:
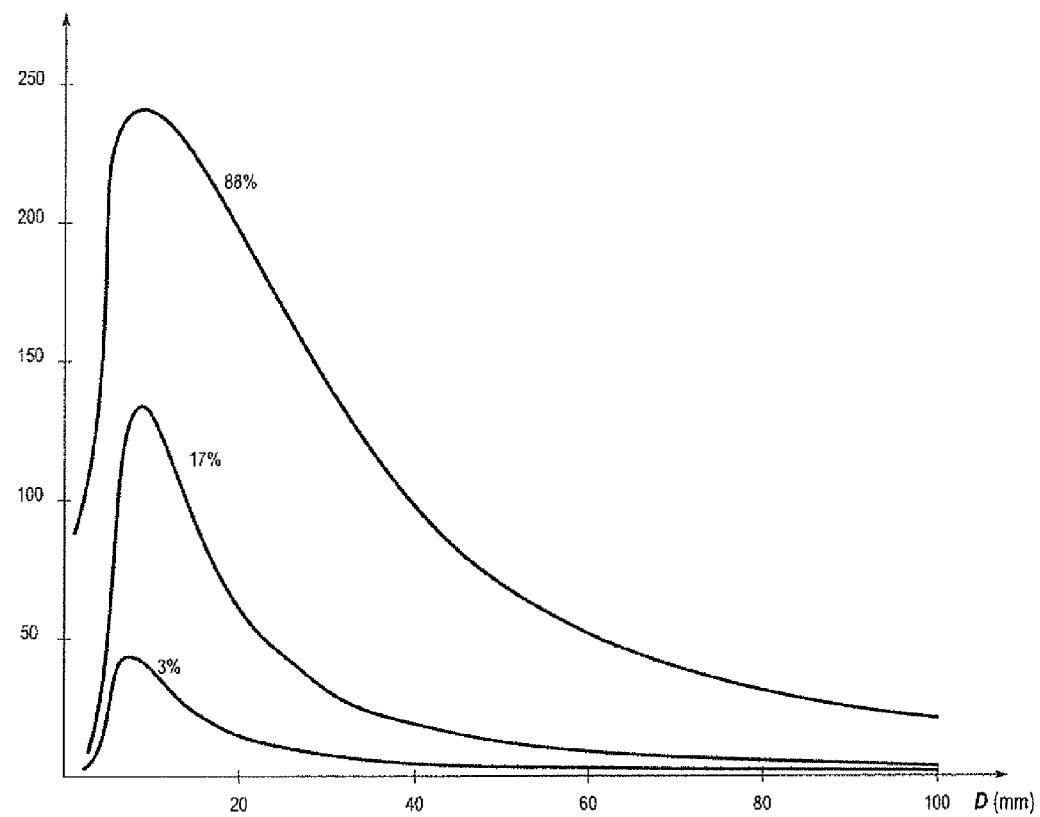
FIG. 2 illustrates an exemplary set of curves representing the intensity of a photon flux received by a time of flight sensor according to the distance and reflectance of the target object in accordance with the invention.

FIG. 2 illustrates an exemplary set of curves representing the intensity of the photon flux received by the detector 14 as a function of the distance D and the reflectance R of the target object. The intensity I may be expressed, as indicated, by the number of photons received by the detector for each transmitted pulse. Three curves are shown for respective reflectance values of 88%, 17% and 3%.

For each curve, a maximum intensity value is reached at a distance of about 10 mm. This distance where the maximum value is reached depends on the offset between the emitter 10 and detector 14. Below this distance, the object is too close to the emitter, whereby the reflected photons no longer reach the detector. From the maximum value, the intensity decreases substantially in inverse proportion to the distance.

For a given distance, the amplitude is not proportional to the reflectance—it is not trivial to construct the curve for a given reflectance from curves known for other reflectance values. The inventors have however found that the intensity, for a given distance, is substantially proportional to the covered area of the photon emission cone by an object having a uniform reflectance. The measured value of the covered area may be used, as discussed below, to determine the transverse position of the object relative to the axis of the emission cone.

Figure 3A:
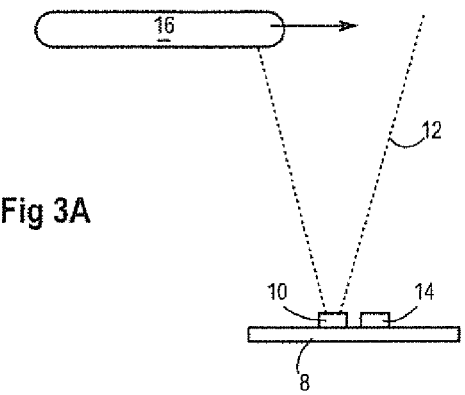
FIGS. 3A and 3B show an object moving in the emission cone of a time of flight sensor and corresponding coverage phases of the cone in accordance with the invention.

In FIG. 3A, it is assumed that a target object 16 moves from the left to the right before a time of flight sensor, passing through the axis of the emission cone 12 of the sensor. It is assumed that the object is flat and large enough to completely cover the cone when it is centered on the axis of the cone.

Figure 3B:
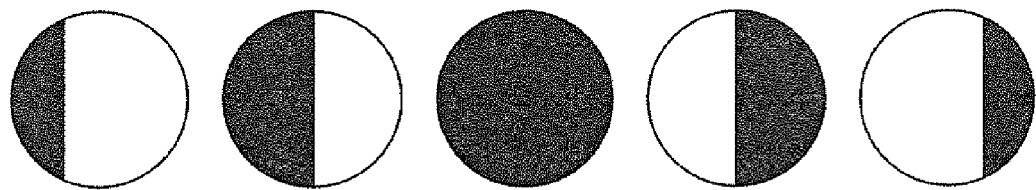

FIG. 3B illustrates various coverage phases of the cone during movement of the target object. The circles represent the useful section of the cone, i.e. the intersection of the cone by the plane of the object, and the black part of the circles represents the covered portion. The central circle corresponds to a total coverage, where the photon detector produces a maximum intensity. The other circles represent different degrees of partial coverage. The intensity produced by the photon detector is proportional to the covered surface. The coverage factor is defined hereinafter as the ratio between the measured intensity and a reference intensity corresponding to a total coverage.

The reference intensity depends on the distance and the reflectance of the target object. The reference intensity could thus be provided by one of the reference curves of FIG. 2, chosen according to the reflectance.

Figure 4:
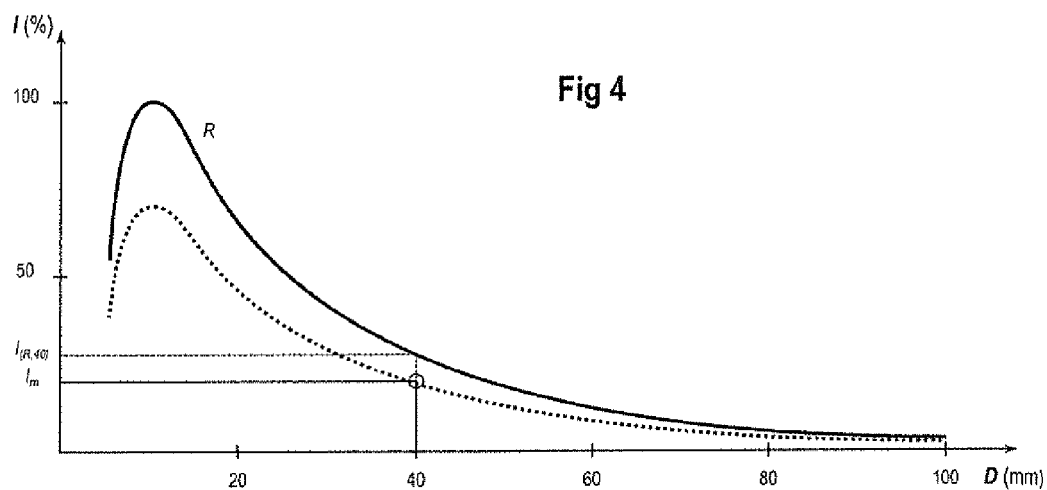
FIG. 4 illustrates a technique for determining the coverage factor of the cone based on knowledge of the reflectance of the object and of the corresponding distance-intensity curve in accordance with the invention.

FIG. 4 illustrates a technique for determining the coverage factor based on the knowledge of the reflectance R of the target object and the corresponding reference curve. The sensor produces a measured intensity Im and a measured distance Dm, 40 mm for example. Assuming that the reflectance of the object is R, the intensity i(R,40) is read from the curve for a distance of 40 mm. The coverage factor is then equal to C=Im/I(R,40).

However, the reflectance of the target object is not necessarily known. The object is, in practice, the hand of the user, and its reflectance depends on various parameters, such as pigmentation of the skin and its surface state. The user could also wear gloves. Although the system could be designed for a manual adjustment of the reflectance, it is convenient to provide a calibration phase during which the reflectance of the object is evaluated.

Figure 5A:
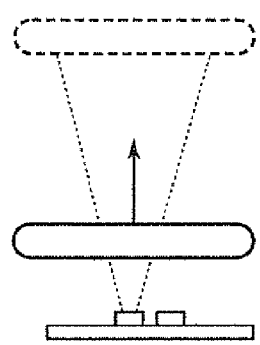
FIGS. 5A and 5B illustrate a first reflectance calibration technique for determining the cone coverage factor in accordance with the invention.
Figure 5B:
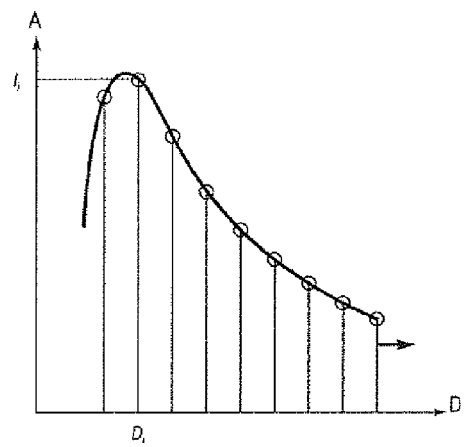

FIGS. 5A and 5B illustrate a first technique to take into account the reflectance. The sensor is placed in a calibration phase, and the user is prompted to move the target object, or his hand, along the axis of the emission cone.

FIG. 5A illustrates the movement of the target object between a position near the sensor (in solid lines) and a remote position (in dotted lines). It is assumed that the object completely covers the emission cone throughout this movement.

FIG. 5B illustrates a reference intensity curve constructed during the calibration phase. While the object moves, the sensor control system periodically stores the current distance (current time of flight) Di and the corresponding intensity value Ii. At the end of the calibration phase, the control system has stored several (intensity, distance) pairs defining a reference curve adapted to the reflectance of the actual object used.

During a normal use phase, the thus constructed reference curve is used according to the technique of FIG. 4 to determine at any time the coverage factor of the emission cone of the sensor. The same reference curve may be used as long as the same target object is used.

Figure 6A:
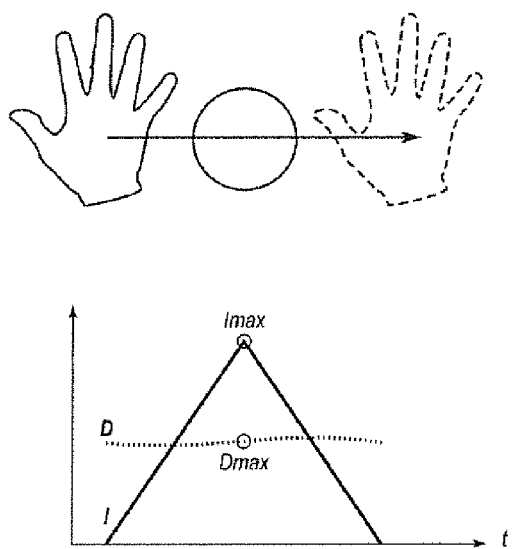
FIGS. 6A and 6B illustrate a second reflectance calibration technique for determining the cone coverage factor in accordance with the invention.
Figure 6B:
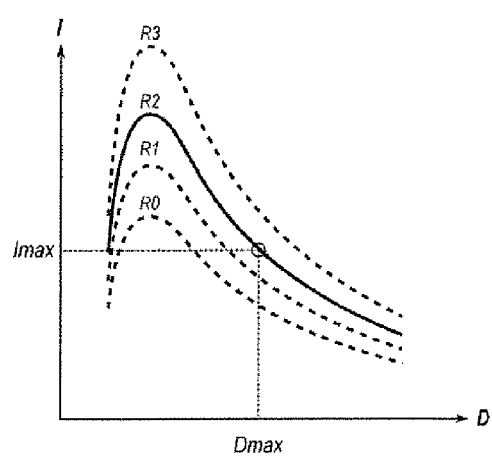

FIGS. 6A and 6B illustrate a technique to take into account the reflectance automatically.

During normal use, as illustrated in the upper part of FIG. 6A, the user may swipe his hand in front of the sensor and happen to fully cover its emission cone.

The lower part of FIG. 6A is a graph corresponding to this situation, illustrating an example of variation with time of the intensity (solid line) and the distance (dashed line) when the hand swipes over the sensor. During each swipe, the intensity reaches a local maximum Im. The system may be designed to regularly detect the local maxima and store the current maximum value Imax with the corresponding measured distance Dmax.

FIG. 6B shows a set of reference curves stored in the system, for various values of reflectance R0, R1, R2 . . . The pair of values (Imax, Dmax) stored in the phase of FIG. 6A is used to select the reference curve serving for the calculation of the coverage factor. It is thus assumed that the maximum value Imax corresponds to a total coverage. As shown by way of example, the pair (Imax, Dmax) defines a point that belongs to the curve R2. This curve R2 is then used to calculate the coverage factor according to the technique of FIG. 4.

In practice, the number of stored reference curves is limited, and the point (Imax, Dmax) does not fall on one of the curves. In such a case, the nearest curve is selected. Alternatively, the curve to use may be interpolated between the two nearest curves.

The coverage factor obtained by these techniques may be exploited in various human-machine interface applications.

By using a single time of flight sensor, both a vertical and transversal proximity of the hand may be detected. The vertical proximity is quantitative and corresponds to the distance normally provided by the sensor. The transversal proximity is provided qualitatively by the coverage factor. A transversal approaching movement is detected when the coverage factor increases, and a transversal departing movement is detected when the coverage factor decreases.

By using two time of flight sensors emitting photons in cones with parallel axes, a quantitative measure of the position of an object between both sensors may be provided, together with the direction of movement between the two sensors.

A swipe of an object from a first sensor towards the second sensor may be detected when the coverage factor of the first sensor decreases as the coverage factor of the second sensor increases. The abscissa x of the object on the axis connecting the two sensors may be determined as the barycenter of the abscissas Xa, Xb of the two sensors, weighted by the coverage factors Cxa, Cxb of the sensors. In other words:

$$x = \frac{Cxa \cdot Xa + Cxb \cdot Xb}{Cxa + Cxb}$$

For an object of a certain size, the abscissa may locate the center of the object along the x-axis.

As indicated above, the coverage factor may be expressed by $C=Im/I(R,Dm)$, where Im is the measured intensity and $I(R,Dm)$ is the intensity read for the measured distance Dm on the reference curve assigned to the reflectance R. If the distance of the object at the level of each sensor is the same, the term $I(R,Dm)$ disappears from the expression of the abscissa x. In other words, assuming that the object has a surface parallel to the sensor support, the expression of the abscissa is independent of the reflectance.

Figure 7:
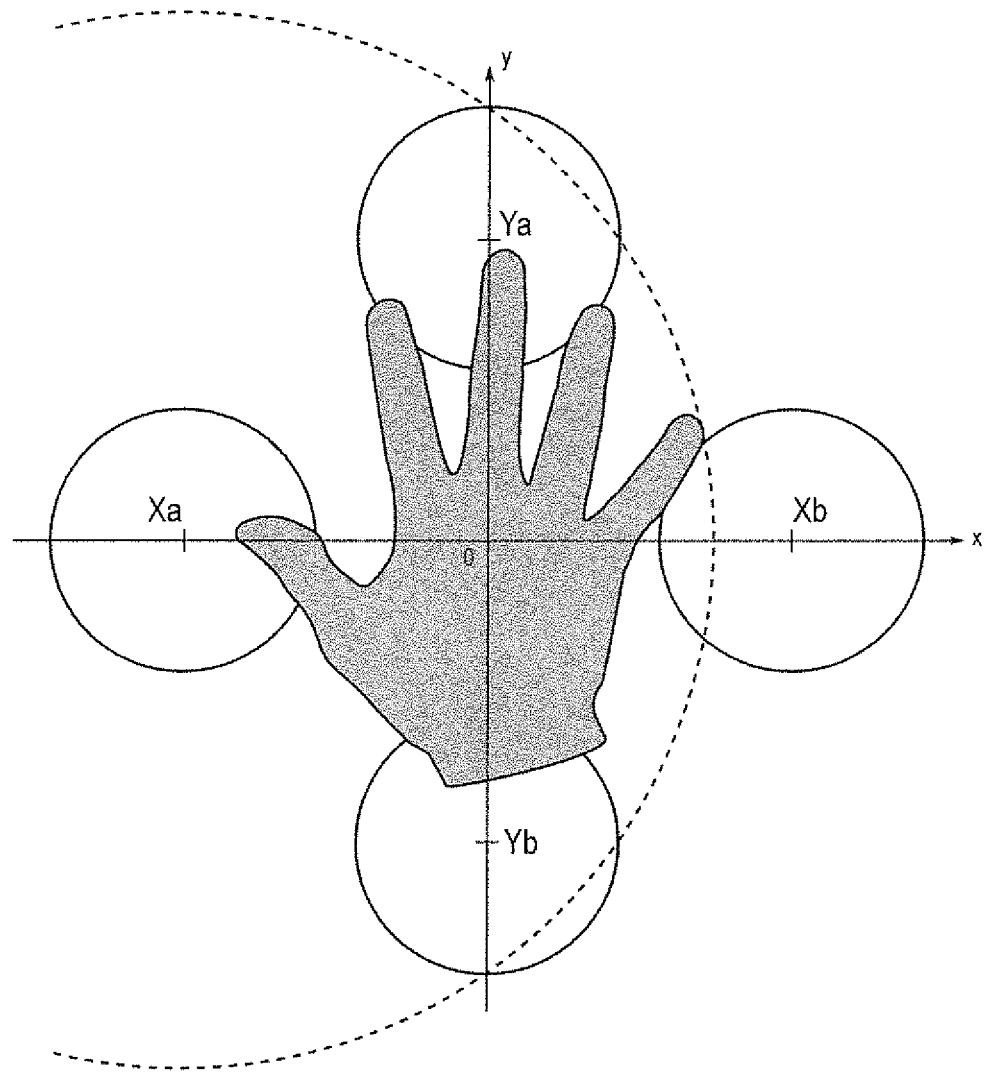
FIG. 7 illustrates an implementation of several time of flight sensors to determine the transverse position of an object of the respective coverage factors of the sensors in accordance with the invention.

FIG. 7 shows a sensor configuration for locating an object, such as a hand, in space. Four time of flight sensors are arranged on a flat support such that their emission cones have parallel axes. A first sensor pair Xa, Xb is arranged along an abscissa axis x and the second sensor pair Ya, Yb is arranged along a perpendicular ordinate axis y. The sensors are preferably arranged in a rhombus, as shown. The center of the rhombus is then the origin of the coordinate system.

With this configuration, the x-coordinate is expressed as above, by:

$$x = \frac{Cxa \cdot Xa + Cxb \cdot Xb}{Cxa + Cxb}$$

And the y-coordinate is expressed by:

$$y = \frac{Cya \cdot Ya + Cyb \cdot Yb}{Cya + Cyb}$$

Where Ya and Yb are the y-coordinates of sensors Ya and Yb, and Cya and Cyb the respective coverage factors of sensors Ya and Yb.

These relationships are applicable to any pair of sensors of arbitrary coordinates in a same coordinate system. Thus, if the target object only covers sensors Xa and Ya, for example, its coordinates may be determined by applying these relationships with (Xb, Yb, Cxb, Cyb)=(0, 0, Cya, Cxa).

The average elevation z of the object may be provided as the average of the distances produced by the four sensors.

The transversal range of use of the sensor system depends on the distance (z) of the object, which determines the effective section of the emission cones. In a lower limit configuration, the object placed in the center of the sensor system is located outside the cones and is tangent thereto, as shown for sensor Xb. In a higher limit configuration, the object is located within the cones and is tangent thereto from the inside, as shown by a dotted circle corresponding to the cone of sensor Xa. A preferred configuration corresponds to the case where the useful sections of the cones are tangential.

What is claimed is:

1. A method of evaluating a coverage factor of a photon emission area of a time of flight sensor, comprising:
    assigning a reference curve to the time of flight sensor, providing a photon flux intensity as a function of time of flight;
    acquiring a time of flight and a corresponding flux intensity with the time of flight sensor;
    reading the intensity provided by the reference curve for the acquired time of flight; and
    providing an indication of the coverage factor based upon the acquired flux intensity and the read intensity.

2. The method according to claim 1 wherein providing the indication comprises providing the indication of the coverage factor based upon a ratio between the acquired flux intensity and the read intensity.

3. The method according to claim 1 wherein the reference curve is constructed in a calibration phase by at least:
    moving a reference object along an axis of the photon emission area between two positions where the object completely covers the photon emission area;
    during the movement, storing values of multiple times of flight and corresponding flux intensities; and
    constructing the reference curve from the stored values.

4. The method according to claim 1 wherein the reference curve is selected from a set of multiple reference curves assigned to different reflectance values, by at least:
    measuring changes in the intensity of the flux;
    storing a local maximum value of the intensity of the flux and the corresponding time of flight; and
    finding in the set of curves the curve that, for the stored time of flight, provides an intensity closest to the stored local maximum value.

5. A method of detecting motion of an object, using a time of flight sensor, comprising:
    evaluating a coverage factor of an emission area of the time of flight sensor by at least
        assigning a reference curve to the time of flight sensor, providing a photon flux intensity as a function of time of flight,
        acquiring a time of flight and a corresponding flux intensity with the time of flight sensor,
        reading the intensity provided by the reference curve for the acquired time of flight, and providing an indication of the coverage factor based upon the acquired flux intensity and the read intensity; and determining that the object approaches the time of flight sensor when the coverage factor increases, or determining that the object moves away from the time of flight sensor when the coverage factor decreases.

6. The method according to claim 5 wherein providing the indication comprises providing the indication of the coverage factor based upon a ratio between the acquired flux intensity and the read intensity.

7. A method of detecting motion of an object, using two time of flight sensors emitting photons in respective first and second emission areas of parallel axes, comprising:
evaluating a coverage factor of each emission area by at least
assigning a reference curve to the time of flight sensor, providing a photon flux intensity as a function of time of flight,
acquiring a time of flight and a corresponding flux intensity with the time of flight sensor,
reading the intensity provided by the reference curve for the acquired time of flight, and
providing an indication of the coverage factor based upon the acquired flux intensity and the read intensity; and
detecting a motion of the object from the first emission area to the second emission area when the coverage factor of the second emission area increases and the coverage factor of the first emission area decreases.

8. The method according to claim 7 wherein providing the indication comprises providing the indication of the coverage factor based upon a ratio between the acquired flux intensity and the read intensity.

9. A method of evaluating a position of an object, using a first pair of time of flight sensors emitting photons in respective first and second emission areas of parallel axes, comprising:
evaluating a coverage factor of each emission area by at least
assigning a reference curve to the time of flight sensor, providing a photon flux intensity as a function of time of flight,
acquiring a time of flight and a corresponding flux intensity with the time of flight sensor,
reading the intensity provided by the reference curve for the acquired time of flight, and
providing an indication of the coverage factor based upon the acquired flux intensity and the read intensity; and
producing an abscissa of the object as a barycenter of the abscissas of the pair of time of flight sensors, weighted by the coverage factors of the corresponding emission areas.

10. The method according to claim 9 wherein providing the indication comprises providing the indication of the coverage factor based upon a ratio between the acquired flux intensity and the read intensity.

11. The method according to claim 9, further comprising using a second pair of time of flight sensors arranged along an ordinate axis perpendicular to the axis, of abscissa, of the first pair of time of flight sensors.

12. The method according to claim 11 wherein using the second pair of time of flight sensors comprises:
evaluating a coverage factor of each emission area of the second pair of sensors by at least
assigning a reference curve to the time of flight sensor, providing a photon flux intensity as a function of time of flight,
acquiring a time of flight and a corresponding flux intensity with the time of flight sensor,
reading the intensity provided by the reference curve for the acquired time of flight, and
providing an indication of the coverage factor based upon the acquired flux intensity and the read intensity;
producing an ordinate of the object as a barycenter of the ordinates of the second pair of time of flight sensors, weighted by the coverage factors of the corresponding emission areas; and
producing an elevation of the object based on the average of the times of flight provided by the second pair of time of flight sensors.

13. An electronic device comprising:
an infrared radiation source configured to emit photons in a photon emission area;
a photon detector adjacent said infrared radiation source configured to receive photons reflected from an object placed in the emission area; and
a control circuit coupled to said infrared radiation source and said photon detector and configured to define a coverage factor of the photon emission area by at least
assigning a reference curve providing a photon flux intensity as a function of time of flight,
acquiring a time of flight and a corresponding flux intensity,
reading the intensity provided by the reference curve for the acquired time of flight, and
providing an indication of the coverage factor based upon the acquired flux intensity and the read intensity.

14. The electronic device according to claim 13 wherein said control circuit is configured to provide the indication of the coverage factor based upon a ratio between the acquired flux intensity and the read intensity.

15. The electronic device according to claim 13 wherein said control circuit is configured to construct the reference curve in a calibration phase by at least:
during movement of a reference object along an axis of the photon emission area between two positions where the object completely covers the photon emission area, storing values of multiple times of flight and corresponding flux intensities; and
constructing the reference curve from the stored values.

16. The electronic device according to claim 13 wherein said control circuit is configured to select the reference curve from a set of multiple reference curves assigned to different reflectance values, by at least:
measuring changes in the intensity of the flux;
storing a local maximum value of the intensity of the flux and the corresponding time of flight; and
finding in the set of curves the curve that, for the stored time of flight, provides the intensity closest to the stored local maximum value.

17. The electronic device according to claim 13 wherein said photo detector comprises a single photon avalanche diode (SPAD).

* * * * *